United States Patent

Webb et al.

[19]

[11] Patent Number: 6,067,617
[45] Date of Patent: *May 23, 2000

[54] SPECIALIZED MILLICODE INSTRUCTIONS FOR PACKED DECIMAL DIVISION

[75] Inventors: Charles Franklin Webb; Wen He Li, both of Poughkeepsie, N.Y.

[73] Assignee: International Business Machines Corporation, Armonk, N.Y.

[*] Notice: This patent is subject to a terminal disclaimer.

[21] Appl. No.: 09/056,486

[22] Filed: Apr. 7, 1998

[51] Int. Cl.[7] .............................. G06F 9/22; G06F 9/302
[52] U.S. Cl. ........................ 712/245; 712/229; 708/652
[58] Field of Search .................................. 712/209, 226, 712/229, 245, 247, 221; 708/652, 651

[56] References Cited

U.S. PATENT DOCUMENTS

| | | | |
|---|---|---|---|
| 4,384,341 | 5/1983 | Tague et al. | 364/763 |
| 5,226,164 | 7/1993 | Nadas et al. | 712/209 |
| 5,280,593 | 1/1994 | Bullions, III et al. | 712/208 |
| 5,345,567 | 9/1994 | Hayden et al. | 712/228 |
| 5,694,587 | 12/1997 | Webb et al. | 712/224 |
| 5,694,617 | 12/1997 | Webb et al. | 710/40 |
| 5,748,951 | 5/1998 | Webb et al. | 395/376 |
| 5,754,810 | 5/1998 | Webb et al. | 395/376 |
| 5,802,359 | 9/1998 | Webb et al. | 395/568 |

OTHER PUBLICATIONS

"A High–Frequency Custom CMOS S/390 Microprocessor" by C. F. Webb & J. S. Liptay, International Conference on Computer Design Oct. 12–15, 1997, pp. 241–246.
"Milli–Code" by R. J. Bullions et al., INBM Technical Disclosure Bulletin, vol. 35, No. 4A, Sep. 1992, pp. 451–454.

*Primary Examiner*—Richard L. Ellis
*Attorney, Agent, or Firm*—Lynn L. Augspurger

[57] ABSTRACT

A computer system having a pipelined computer processor, which executes a relatively simple instruction set in a hardware controlled execution unit and executes a relatively complex instruction set in a milli-mode architected state with a millicode sequence of simple instructions in said hardware controlled execution unit, a millicode operating in a milli-mode state when macro-mode decoding by said processor is suspended to cause the system to subsequently use processor milli-registers and the processor's decoder decodes them and schedules them for execution upon entry into the processor milli-mode. Millicode flags allow specialized update and branch instructions and flags are either cleared or specifically set for a millicode instruction. A millicode instruction for editing functions processes one byte of an input pattern string, generates one byte of an output string, and updates various pointers and state indications to prepare for processing the next byte in a string. Translate Fetch (TRFET) millicode instructions support a Translate and Test TRT instruction and specialized millicode instructions for packed decimal division make use of the hardware control and dataflow logic designed to support simpler packed decimal operations including Add to provide operand access, checking, preparation, and storing functions, and to generate the quotient digits as needed for the DP instruction are implemented as as internal code instructions, rather than implementing the entire DP function in hardware, and control is maintained in internal code allowing simpler handling of unusual and boundary conditions.

4 Claims, 3 Drawing Sheets

SFLG D$_2$,B$_2$     [S]

| 'B29C' | B2 | D2 |
|---|---|---|
| 0                                  16 | 20 | 31 |

FIG.2A

RFLG D$_2$,B$_2$     [S]

| 'B29D' | B2 | D2 |
|---|---|---|
| 0                                  16 | 20 | 31 |

FIG.2B

LFLG D$_2$,B$_2$     [S]

| 'B29E' | B2 | D2 |
|---|---|---|
| 0                                  16 | 20 | 31 |

FIG.2C

BRFLG M$_1$,M$_3$,I$_2$     [RI]

| 'AA' | M1 | M3 | I2 |
|---|---|---|---|
| 0         8 | 12 | 16 | 31 |

FIG.2D

EDBYT R$_1$,R$_2$     [RRE]

| 'B2DF' | ////////// | R1 | R2 |
|---|---|---|---|
| 0                             16 | 24 | 28 | 31 |

FIG.3

TRTX R₁,R₂        [RRE]

| 'B2E9' | //// | //// | R1 | R2 |
|---|---|---|---|---|
| 0 | 16 | 20 | 24 | 28  31 |

FIG.4

DPFET D₁,B₁,D₂,B₂ [SSE]

| 'E518' | B1 | D1 | B2 | D2 |
|---|---|---|---|---|
| 0 | 16  20 | 32 | 36 | |

FIG.5A

DPQUO R₁,R₂,R₃   [RRF]

| 'B2EF' | R3 | //// | R1 | R2 |
|---|---|---|---|---|
| 0 | 16 | 20 | 24 | 28  31 |

FIG.5B

DPSTO D₂,B₂     [S]

| 'B291' | B2 | D2 |
|---|---|---|
| 0 | 16 | 20    31 |

SPECIALIZED MILLICODE INSTRUCTIONS FOR PACKED DECIMAL DIVISION

CROSS REFERENCE TO RELATED APPLICATIONS

The present U.S. patent application is related to the following co-pending U.S. patent applications which are assigned to the assignee of the present application International Business Machines Corporation, (A U.S. Company or Corporation), Armonk, N.Y. (New York), US (United States of America) and filed contemporaneously herewith:

U.S. patent application Ser. No. 09/056,485, filed Apr. 7, 1998, and entitled "Millicode Flags with Specialized Update and Branch Instructions"; and U.S. patent application Ser. No. 09/056,344, filed Apr. 7, 1998, and entitled "Specialized Millicode Instruction for Editing Functions"; and U.S. patent application Ser. No. 09/056,484, filed Apr. 7, 1998, and entitled "Specialized Millicode Instruction for Translate and Test".

FIELD OF THE INVENTION

This invention relates to improvements in pipelined computer processors that execute relatively simple instructions in hardware controlled execution units and execute relatively complex instructions in a milli-mode architected state with vertical microcode (i.e. millicode) routines executing in the same hardware controlled execution units. More particularly, this invention relates to Specialized Millicode Instructions for Packed Decimal Division

GLOSSARY

The glossary needs to be checked and completed

ED is the ESA/390 Edit instruction

EDMK is the ESA/390 Edit and Mark instruction

GR refers to a general register; while MGR refers to a millicode general register as opposed to a program general register. MAR refers to a millicode access register MCR referes to the millicode control registers TRFET refers to the new Translate Fetch millicode instruction TRT refers to an ESA/390 Translate and Test (TRT) instruction.

QSD refers to quotient digits

QX refers to a specific quotient digit

BACKGROUND OF THE INVENTION

In the last year International Business Machines Corporation introduced a new generation of S/390 ESA CMOS machines known as the G4 generation. There was then introduced a pipelined computer processor which provided for the use of millicode and which in a milli-mode architected state tests the validity of a program status word with a mask stored in a millicode general register (MGR). The mask indicates bits in the program status word which are to be zeros if the word is valid. A logical AND operation is performed between correspondingly positioned bits in the word and bits in the mask and in addition the status of at least one other bit in the word is checked, a bit other than a correspondingly positioned bit.

A milli-mode operation enables implementation of complex functions in a large, hardware controlled, pipelined, general purpose digital computer without a microprocessor. Milli-mode implements these complex functions with the flexibility provided by firmware and avoids a packaging problem introduced by the inclusion of microprocessor hardware. Rather than a microprocessor, milli-mode uses the preexisting dataflow and hardware controlled execution units of a pipelined processor to accomplish complex functions. Additional hardware controlled instructions (private milli-mode only instructions) are added to provide control functions or to improve performance. These private milli-mode instructions augment the architected instruction set. Milli-mode routines can intermingle the milli-mode only instructions with architected instructions to implement complex functions. as illustrated by U.S. Pat. No. 5,694,587, issued Dec. 2, 1997. U.S. Pat. No. 5,694,587 describes specialized millicoded instructions for a PSW Validity Test, Load With Access Test, and Character Translation Assist, which were employed in the IBM machine known as the G4 S/390 machine introduced in 1997. Related to U.S. Pat. No. 5,694,587 were additional applications related to milli-code which are implemented in the same G4 S/390 machine introduced in 1997 by International Business Machines Corporation. These were:

Application Ser. No. 08/414,821, filed Mar. 31, 1995, entitled "Millicode Read-Only Storage With Entry Point Patch Control." A divisional application Ser. No. 08/455,820, filed May 31, 1995, (now U.S. Pat. No. 5,625,808 issued Apr. 29, 1997) entitled "Read Only Store as Part of Cache Store for Storing Frequently Used Millicode Instructions."

Application Ser. No. 08/414,977, filed Mar. 31, 1995, (now U.S. Pat. No. 5,673,391 issued Sep. 30, 1997) entitled "Hardware Retry Trap for Millicoded Processor"

Application Ser. No. 08/414,158, filed Mar. 31, 1995, (now U.S. Pat. No. 5,680,598 issued Oct. 21, 1997) entitled "Addressing Extended Memory Using Millicode."

Application Ser. No. 08/414,812, filed Mar. 31, 1995, entitled "Mapping Processor State Into A Millicode Addressable Processor State Register Array" was abandoned in favor of a File Wrapper Continuation application Ser. No. 08/892,068 filed Jul. 14, 1997, same title, now U.S. Pat. No. 5,802,359 issued Sep. 1, 1998.

Application Ser. No. 08/414,164, filed Mar. 31, 1995, (now U.S. Pat. No. 5,713,035 issued Jan. 27, 1998) entitled "Linking Program Access Register Number With Millicode Operand Access."

Application Ser. No. 08/414,975, filed Mar. 31, 1995, (now U.S. Pat. No. 5,694,617 issued Dec. 2, 1997) entitled "Priority and Recovery Method For System Serialization (Quiesce)."

However, we discovered that there could still be improvements in the millicode environment. We will use in a new machine a new modality for millicode implementation which employs a group of new millicode improvements. Here a current group of improvements will be described together for understanding their relationship together.

To illustrate, we have obtained improvement in a processor implementing International Business Machines Corporation' ESA/390 architecture and using millicode as internal code for complex operations, by providing a new and an efficient means to answer the need to set and test various conditions. In this area in the past various forms of status bits and condition codes have been used in internal code. The millicode copy of the ESA/390 condition code and the corresponding Branch on Condition instructions are limited by the 2-bit format and by the broadly general usage, which prevents the condition code from holding information across many instructions. Bits of millicode registers can be defined to record various conditions, and can be connected to branch points, but this creates a problem in a pipelined processor which limits their usefulness in performance-sensitive millicode routines. Alternatively, status bits in millicode registers can be explicitly tested via the millicode condition code and Branch on Condition instructions, but this requires multiple instructions, which can impact performance in certain routines. This scheme also requires separate millicode instructions to manipulate the flags in response to the detection of various conditions, again impacting performance in some cases. For our preferred embodiment in the new modality for satisfying the need to set and test various conditions, refer to the section below entitled "Millicode Flags with Specialized Update and Branch Instructions."

For another improvement we have focused on the ESA/390 instructions Edit and Edit and Mark which process a string of characters and decimal digits using a second string as a pattern Generally, it has been recognized that in an ESA/390 implementation which uses millicode as its internal code, handling all of the cases and states defined by ESA/390 requires a significant number of CP cycles. This impacts the performance of these ESA/390 instructions, and thus of programs which make use of these instructions. Past S/390 (and its predecessors) CPUs have used a variety of algorithms to execute the Edit (ED) and Edit and Mark (EDMK) instruction. For the most part these have used internal code, and in some cases special internal code instructions have been defined to accelerate this function. There has been a need for a new generation machine to improve the performance of these instructions. For the key modality for this purpose, refer to the section below entitled "Specialized Millicode Instruction for Editing Functions".

Now even our recent improvements as illustrated by U.S. Pat. No. 5,694,587, issued Dec. 2, 1997. in the ESA/390 instruction Translate and Test (TRT) requires updates to two General Registers (GRs) and the condition code to reflect the results of the operation. Past S/390 (and its predecessors) CPUs have used a variety of algorithms to execute the Translate and Test (TRT) instruction. For the most part these have used internal code, and in some cases special internal code instructions have been defined to accelerate this function. In an ESA/390 implementation which uses millicode as its internal code, the computation and propagation of these results requires a significant number of CP cycles even after the translation and testing of operand bytes is complete. This impacts the performance of the Translate and Test instruction, and thus of program which make use of this instruction. So in order to improve performance, we have provided a new and specialized instruction described in the section below entitled "Specialized Millicode Instruction for Translate and Test"

Lastly, in this description we have improved on packed decimal division. Past S/390 (and its predecessors) CPUs have used a variety of algorithms to execute the Divide Decimal (DP) instruction. For the most part these have used internal code, and few if any internal code instructions have been defined to accelerate this function. Packed decimal division is a computationally complex operation, particularly when the only packed decimal arithmetic hardware available is an adder (as is commonly the case). Because of this, the internal code sequences required to support the ESA/390 instruction Divide Decimal (DP) can require a large number of cycles. In an application which makes even moderately frequent use of this operation, the time spent executing DP instructions can have a significant negative impact on processor performance. For this purpose please refer to the section below entitled "Specialized Millicode Instructions for Packed Decimal Division"

SUMMARY OF THE INVENTION

An object of this invention is the provision of a specialized millicode instruction set which reduces the number of millicode instructions and machine cycles required to perform a certain complex operation that is called relatively frequently.

Another object of this invention is the provision of a specialized millicode instruction set which conforms to an instruction format for normal (i.e. non-millicode) operation and which requires a minimum of hardware unique to the specialized set and for this purpose we have provided the improvements described under the sections relating to Millicode Flags with Specialized Update and Branch Instructions; Specialized Millicode Instruction for Editing Functions; Specialized Millicode Instruction for Translate and Test; and Specialized Millicode Instructions for Packed Decimal Division which are now preferred for our ESA/390 environment for a CMOS implementation, as we describe them below.

BRIEF DESCRIPTION OF THE DRAWINGS

The foregoing and other objects, aspects and advantages will be better understood from the following detailed description of a preferred embodiment of the invention with reference to the drawings, in which:

FIG. 2 is a pictorial representation of the millicode flags with specialized update and branch instructions, where Set Flags is defined by FIG. 2A; Reset Flags is defined by FIG. 2B; Load Flags is defined by FIG. 2C; and Branch Relative on Flags is defined by FIG. 2D.

FIG. 3 is is a pictorial representation of the EDBYT instruction defined by FIG. 3 as a specialized millicode instruction for editing functions;

FIG. 4 is a pictorial representation of the TRT Ending specialized millicode instruction for Translate and Test; and FIG. 5 is a pictorial representation of the specialized millicode instructions for packed decimal division, where FIG. 5A represents the Divide Decimal Fetch; and FIG. 5B illustrates the Divide Decimal Quotient; and the Divide Decimal Store is illustrated by FIG. 5C.

DETAILED DESCRIPTION

Figure 1:
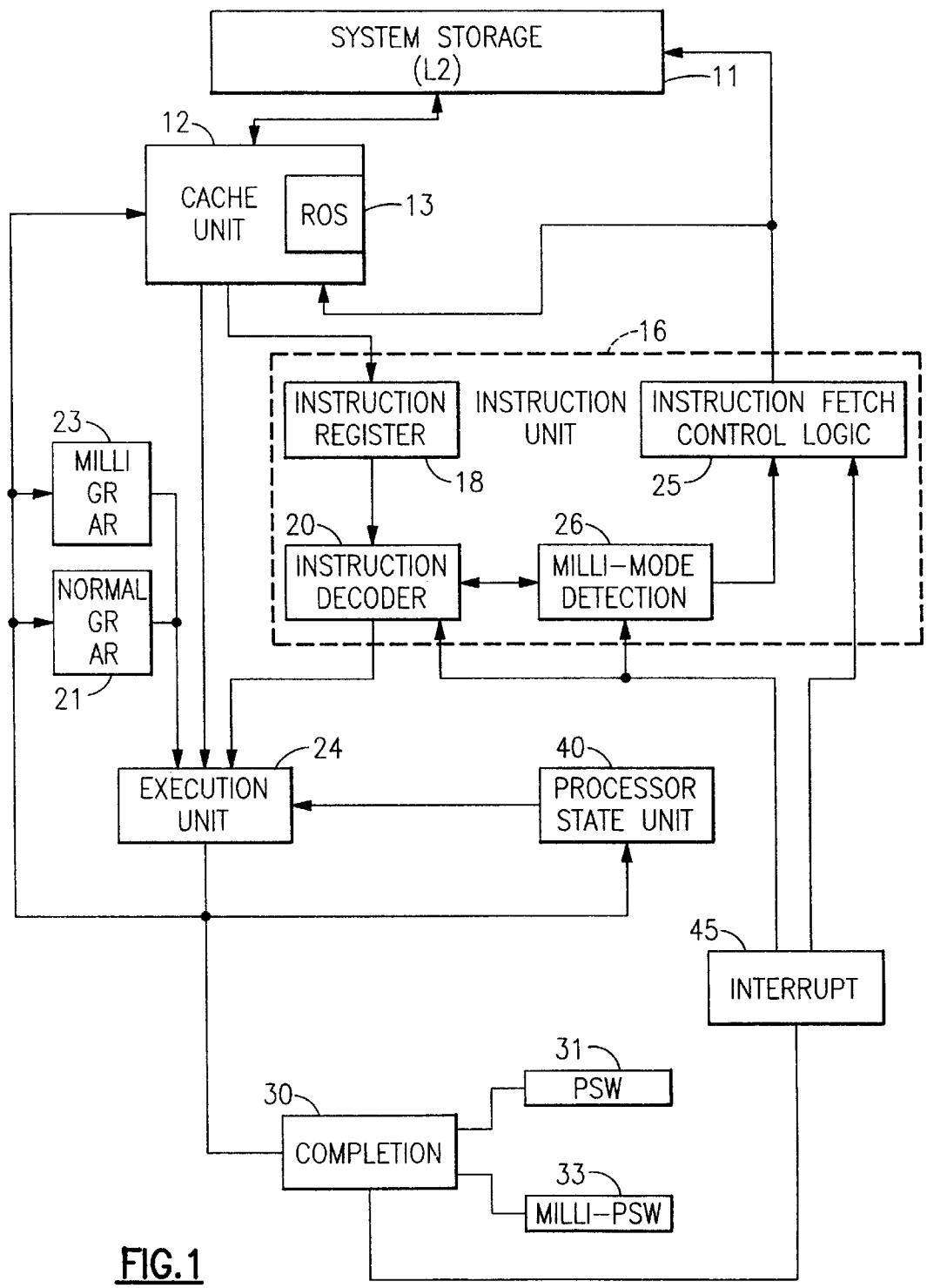
FIG. 1 is a block diagram illustrating the components of a millicode system in accordance with a preferred specific embodiment of the invention, which is common to the system used for U.S. Pat. No. 5,694,587.

Our improvements described herein are directed to Millicode Flags with Specialized Update and Branch Instructions; and Specialized Millicode Instruction for Editing Functions; and Specialized Millicode Instruction for Translate and Test; and Specialized Millicode Instructions for Packed Decimal Division; and each of these is described under a sub-heading by the referenced name. However, all these improvements relate to our pipelined computer processor, which executes a relatively simple instruction set in a hardware controlled execution unit and executes a relatively complex instruction set in a milli-mode architected state with a millicode sequence of simple instructions in the hardware controlled execution unit. The millicode is frequently used and loaded into an extension of the L1 cache prior to need when the instruction decode logic detects the requirement to enter milli-mode which coses the millicodes to be fetched to a milli-code portion of the machines buffer control elements store through hich speed cache array which functions as a first level of the storage hierarchy of the machine. The millicodes include the fields specified which provide specific data for the registers which will be used.

Instruction sets used in computer systems employing so-called Complex Instruction Set Computing (CISC) architecture include both simple instructions (e.g. Load, or Add) and complex instructions (e.g. Program Call, or Load Address Space Parameters). These complex instructions are described in the "IBM Enterprise Systems Architecture/390 Principles of Operation" (which is well known but available from IBM Corporation, Armonk, N.Y. as Publication Number SA22-7201-02). As these computer systems (e.g. IBM System S/390 systems using the ESA/390 architecture) have become more powerful, larger percentages of the instruction set have been implemented using hardware execution units to increase the systems performance. Conventionally, the complex functions are implemented in microcode because building hardware execution units to execute them is expensive and error prone. Microcode was for instance a feature of the G3 S/390 machines prior to the introduction of the G4 level of technology in 1997.

Implementing complex functions in microcode provides flexibility to fix problems and expandability in that additional functions can be included later. In certain prior art machines, where much of the processor is hardware controlled, a dedicated microprocessor based execution unit is often provided in order to implement the complex functions. This unit can be microprogrammed to execute complex instructions and complex functions such as handling interrupt conditions.

More recently, prior art proposals have been advanced for machines with a so-called milli-mode operating capability; see, for example, IBM Technical Disclosure Bulletin Vol. 35, No. 4A of September 1992, incorporated herein by reference, and U.S. Pat. Nos. 5,280,593 and 5,226,164 assigned to the assignee of this invention and also incorporated herein by reference.

In order to introduce the new concepts, as background we will describe milli-mode detection logic which in the instruction decode logic detects the requirement to enter milli-mode, and this causes millicode routines to be fetched. The millicode routines are decoded by the decoder hardware and dispatched for execution in the same way as the architected macro-instructions (system-mode instructions).

Practically all of the architected macro-instructions that are implemented as hardware controlled instructions can be executed in milli-mode. The set of instructions available in milli-mode can be considered to be an alternate architecture that the processor can execute.

The hardware-executed instructions which are valid only for millicode are generally of a format and a function similar to those of ESA/390 instructions. In this way, the unique hardware required to implement these instructions is minimized, and the simplicity of the hardware design is maintained. This simplicity of hardware controls is a chief advantage of millicode over other forms of internal code (e.g. microcode) which require considerably more unique hardware.

A disadvantage of a millicoded design is that some complex operations require more internal code instructions and/or more machine cycles than with some forms of microcode. In some cases, this is due to the inefficiency of the base instruction set (e.g. the hardware-executed ESA/390 instructions) when used to perform these complex operations. Depending on the frequency with which these operations are performed, the impact on overall system performance may be significant.

It will be noted that as illustrated by U.S. Pat. No. 5,694,587, issued Dec. 2, 1997, we have disclosed prior ideas for Translate and Test. The ESA/390 instructions Translate (TR) and Translate and Test (TRT) use a table of 256 bytes to translate a string of bytes. For each of these ESA/390 instructions, each string byte is used as an index into the table, and the selected table byte is fetched. For Translate, the selected table bytes replace the original string in storage. For Translate and Test, the selected bytes are tested, and the first non-zero table byte selected is returned to the program in a general register along with the address of the string byte which selected it; translate and test also sets the condition code, and does not update storage. In this prior U.S. Pat. No. 5,694,587, it was noted that to provide reasonable performance on Translate and Translate and Test, while maintaining flexibility and simplicity of a millicoded design, a millicode instruction called in the U.S. Pat. No. 5,694,587 "Translate Fetch (TRFET)" was provided specifically for use in execution of the ESA/390 Translate and Translate and Test instructions. This Translate Fetch millicode instruction uses an RX format, but modifies the interpretation of the X sub 2 and D sub 2 fields. Instead of designating a byte offset, the D sub 2 field is used as a 3-bit mask (M sub 2), the remaining bits of D sub 2 being ignored. The low-order 2 bits of this mask select one of the four bytes of the X sub 2 register to use as the actual index (rather than the entire X sub 2 register being used). In addition, the 3-bit mask selects one of the eight bytes of the Millicode General Register (MGR) pair designated by R sub 1 to receive the byte of storage accessed by the operand 2 address. The resulting contents of MGR pair R sub 1 are tested for a non-zero value and the condition code is set accordingly. The only dataflow hardware specifically required for this millicode Translate Fetch instruction is a 4-to-1 byte multiplexer for the X sub 2 input to the address adder.

As in the illustration of U.S. Pat. No. 5,694,587, issued Dec. 2, 1997, the following exemplary embodiment of the invention is applicable in the overall context of a system generally conforming to IBM's current 390 system architecture. Beginning with the G4 development and in our new machine we use for millicode a separate set of millicode general registers, access registers (MAR) and control registers (MCR), in addition to the registers used for macro-instructions, as well as additional instructions to manipulate system status which were not available in the original bipolar ESA/390 machine or later horizontal microcode machines. Our solutions allow millicode routines to implement complete ESA/390 functions. A more detailed description of the conventional elements of such a 390 system processor can be found, for example, in U.S. Pat. No. 4,901,233 to John S. Liptay, assigned to the same assignee as the present invention, and incorporated by reference, in its entirety, as if printed in full below. While the System 390 environment will be used as an example, it should be understood that the present invention is also readily applicable to other IBM (e.g. IBM System 370) and non-IBM architectures as well. While not limited thereto, the invention is particularly well suited for use in conjunction with the enhanced error recovery system described in Ser. No. 08/149,260, filed Nov. 9, 1993, now U.S. Pat. No. 5,504,859 assigned to the assignee of this application, and also incorporated herein by reference. The features of the G4 machine have been discussed in pages 463 . . . 473 of the IBM J. Research and Development, Vol. 41, No 4/5 for July/September 1997 when the G4 level of machine was introduced. This article, called "A high frequency custom CMOS S/390 microprocessor" authored by C. F. Webb and J. S. Liptay, is incorporated by reference.

Referring now to FIG. 1, elements of a system relevant to this invention include a system storage 11, and a cache memory unit 12. The system storage 11 contains the instructions that the processor is executing as well as the data those instructions are manipulating. The cache memory unit 12, which includes a copy of the data and instructions the processor is presently executing, in this preferred embodiment is a cache providing interleaved double word addressing. The cache memory 12 logically includes a contiguously addressable writeable internal code array 13 (a change from the G4), in which code for executing certain frequently invoked milli-mode routines is stored.

An instruction unit subsystem 16 includes an instruction buffer (not shown in FIG. 1), instruction registers 18 and an instruction decoder 20. The instruction unit subsystem receives macro-instructions, millicode instructions, and data from the cache memory unit 12. Instructions are parsed and placed into the instruction registers 18. The decoder 20 reads the contents of the instruction registers 18, decodes the instruction (or causes an operation exception), and passes the instruction to an instruction queue for sequential execution by a hardware execution unit 24. Each hardware execution unit 24 has access to a set of general purpose registers and access registers 21 for normal macro-code instruction execution and to a set of general purpose registers and access registers 23 for millicode instruction execution. Control logic controls the exchange of data between the two sets of registers when beginning or terminating a millicode routine.

Milli-mode detection logic 26 is coupled to the instruction registers and detects when a macro-instruction, which is being decoded, is of a type that is to be interpreted in a milli-mode operation. When this occurs, the milli-mode detection logic 26 generates an entry point address and passes this address along to the instruction fetch control logic 25 and places the decoder 20 into a milli-mode operating state. In this state the decoder is enabled to decode milli-mode instructions. Milli-mode instructions are vertical microcode, consisting of a mixture of regular microcode instructions and special milli-mode only instructions, all of which can be executed in the execution unit 24. The special instructions provide control functions needed by the millicode routines. The set of millicode routines reside outside of the program addressable storage.

The system effects of an executed instruction are architecturally visible in the completion logic 30. Signal lines between the completion logic 30 and the decoder 20 allow the decoder 20 to keep track of instruction completion. A program status word (PSW) in register 31 controls execution of the macro-program. Similarly, the system also includes a milli-PSW register 33, which controls execution of the milli-routine. Both the execution unit 24 and the completion logic 30 are connected to read from/write to the PSW and the milli-PSW registers. Thus, at any given point the execution units or the completion logic can read or update the appropriate one of the PSW and/or milli-PSW registers. A processor state unit 40 maintains the entire updated status of the architected system both in regular mode and milli-mode operation. In the event of a detected error, the processor state unit 40 provides a resource to recreate the status of the system from a check point state in order to allow a retry of the error causing operation.

Milli-mode is enabled when the milli-mode detection logic 26 recognizes that the macro-instruction being decoded is to be implemented with millicode. In response to this recognition, the detection logic 26 signals the decoder 20, the instruction fetch controls 35 and register controls in the execution unit 24. In response to the milli-mode recognition signal from the detection logic 26, the decoder 20 suspends macro-mode decoding, the execution unit register control copies the contents of the GPRs 21 to the milli-registers 23 and causes the system to subsequently use the milli-registers 23. The milli-mode detection logic 26 generates a millicode entry point address.

The entry point address (generated by the milli-mode detection logic 26) is used by the control logic 35 to address the cache 12. Milli-instructions from the cache are sent to the instruction registers 18 where the decoder 20 decodes them and schedules them for execution.

When the processor enters milli-mode, it executes and completes the macro-instructions already in the pipeline conceptually prior to the instruction that caused entry into milli-mode. As the processor completes the macro-instructions, it updates the appropriate GPRs. At the same time, the processor decodes and executes the milli-instructions that implement the macro-instruction that caused entry into milli-mode.

At some point the macro-instruction immediately prior to the instruction that caused entry to milli-mode will be indicated completed in the completion logic 30. Only then does the processor begin to complete the milli-instructions. The processor then continues decoding, executing and completing the milli-instructions.

Eventually, the detection logic 26 recognizes a millicode END (MEND) milli-instruction. When the detection logic 26 detects a MEND milli-instruction, it causes the processor to cease fetching milli-instructions. Further, when MEND is detected, the detection logic puts the decoder in macro-mode and causes the processor to begin fetching macro-instructions. Millicode explicitly updates all registers, so there is no transfer of register content when going from milli-mode operation to regular operation.

Completion of a MEND milli-instruction causes the processor completion logic to begin completing macro-instructions.

The processor can also enter milli-mode in response to an interrupt. When the completion logic detects an interrupt, the interrupt priority logic 45 determines that an interrupt is to be serviced and it signals the instruction fetch unit, causing the decoder to initiate milli-mode. The recognition of an interruption condition causes the processor to halt macro-mode execution at the next interruptible point. The interrupt priority logic 45 also generates control inputs which are used by the milli-mode detection logic to generate an entry point address with which to address the cache. These milli-instructions are sent to the instruction registers where the decoder decodes them and schedules them for execution at the appropriate hardware execution elements.

The processor proceeds to decode, execute and complete the milli-instruction in the milli-routine for interrupts. Eventually, the decoder recognizes a MEND milli-instruction. This causes the decoder to stop decoding in milli-mode. Depending on whether or not there are additional interrupts that require servicing, the decoder hardware will either redo the interrupt process or return to decoding macro-instructions from the cache.

DETAILED DESCRIPTION OF A PREFERRED EMBODIMENTS

Millicode Flags with Specialized Update and Branch Instructions

The solution disclosed here is a set of millicode flags which have some characteristics of the condition code and some of status bits in millicode registers. The flags may be explicitly set and altered by a set of specialized millicode instructions. The flags may also be updated implicitly by certain specialized millicode instructions, serving as an extended condition code, and may alter the execution of specialized millicode instructions. See the sections entitled "Specialized Millicode Instruction for Editing Functions" and "Specialized Millicode Instruction for Translate and Test". The flags are either cleared or specially set on entry to millicode for an instruction, again acting as an extended millicode condition code.

In the initial implementation, the millicode flags are used to indicate special conditions for Move Long and Compare Long (zero lengths for operand 1 or operand 2, and equal lengths for the two operands) and for Load Control (load of CR6 only, load of CR0 only). These settings, which require no additional hardware cycles in millicode entry, eliminate several millicode instructions each in the corresponding millicode routines.

The millicode flags can be used as branch points for static branch resolution. In addition, a new conditional branch instruction is defined for use by millicode which allows millicode to branch, in a manner similar to Branch on Condition, on various combinations of millicode flag settings. This new Branch on Flags instruction is also subject to dynamic branch prediction, such as via a Branch History Table or Branch Target Buffer, in the same manner as Branch on Condition.

The initial implementation of this invention makes use of four millicode flags, as this fits naturally into an ESA/390 millicode design, and is adequate for present purposes. This could easily be extended to a different number of flags. FIG. 2 illustrates the detailed definition for specialized millicode instructions Set Flags, Reset Flags, Load Flags, and Branch on Flags illustrated by FIGS. 2A, 2B, 2C, and 2D.

The Millicode Flags are set as defined with FIG. 2A. The second-operand address $D_2(B_2)$ is not used to access storage; instead, the low-order four bits (bits 28:31) of this address are used as a mask to select which Millicode Flags are to be set. Flags for which the corresponding mask bit is '1'b are set to '1'b; flags for which the corresponding mask bit is '0'b are not changed.

The resulting Flags will be reflected in the result of a subsequent Branch Relative on Flags operation. Millicode must insure that there is sufficient pipeline space between this instruction and a Branch Relative Special instruction which tests a Millicode Flag value updated by this instruction.

The Millicode Flags are reset as defined with FIG. 2B. The second-operand address $D_2(B_2)$ is not used to access storage; instead, the low-order four bits (bits 28:31) of this address are used as a mask to select which Millicode Flags are to be reset. Flags for which the corresponding mask bit is '1'b are reset to '0'b; flags for which the corresponding mask bit is '0'b are not changed.

The resulting Flags will be reflected in the result of a subsequent Branch Relative on Flags operation. Millicode must insure that there is sufficient pipeline space between this instruction and a Branch Relative Special instruction which tests a Millicode Flag value updated by this instruction.

The Millicode Flags are loaded as defined with FIG. 2C. The second-operand address $D_2(B_2)$ is not used to access storage; instead, the low-order four bits (bits 28:31) of this address are written to the four Millicode Flags.

The resulting Flags will be reflected in the result of a subsequent Branch Relative on Flags operation. Millicode must insure that there is sufficient pipeline space between this instruction and a Branch Relative Special instruction which tests a Millicode Flag value updated by this instruction, as defined with FIG. 2D.

The millicode instruction address is replaced by the branch address if the logical function of the millicode flags specified by $M_1$ and $M_3$ is a logical one; otherwise normal instruction sequencing proceeds with the updated millicode instruction address. The contents of the $I_2$ field are a signed binary integer specifying the number of halfwords that is added to the address of the instruction to generate the branch address.

The $M_1$ field selects which of the four Millicode Flags will be used to determine whether the branch is taken. The bits of $M_1$ correspond one-to-one with the four flag bits, and only those flags corresponding to '1'b bits in $M_1$ are used in the determination.

The $M_3$ field selects which logical function will be used to determine whether the branch is taken. The following functions are available:

| Code | Function |
| --- | --- |
| '0000'b | Branch if any selected flag is '1'b |
| '0001'b | Branch if all selected flags are '0'b |
| '0010'b | Branch if all selected flags are '1'b |
| '0011'b | Branch if any selected flag is '0'b |
| '0100'b | Branch if selected flags are mixed '0'b and '1'b (i.e. at least one selected flag is '0'b and at least one is '1'b) |
| '0101'b | Branch if selected flags are not mixed '0'b and '1'b |

Other values of $M_3$ may be defined for different logical functions to determine whether the branch is to be taken.

If $M_1$ is '0000'b, it is unpredictable whether the branch will be taken.

Our preferred embodiment is applicable to an ESA/390 implementation which uses millicode as its internal code. The combinations of explicit and implicit settings, and of using the flags both as branch points (for static branch resolution at instruction decode time) and as a complex condition code (for Branch on Condition—like branching) allow for greater flexibility and in general better millicode performance than any other solutions. This embodiment can be used by those using a ESA/390 processor which uses millicode or internal code similar in form or structure to millicode.

Specialized Millicode Instruction for Editing Functions

The solution described here is to define a new instruction for use by internal code (millicode) in support of the ESA/390 instructions Edit (ED) and Edit and Mark (EDMK). This instruction processes one byte of the pattern string, generating one byte of the output string, and updates various pointers and state indications to prepare for processing the next byte.

A formal definition of this instruction follows. This invention also makes use of the millicode flags, which are included in a separate disclosure.

A single byte is processed for an ESA/390 Edit or Edit and Mark instruction. MGR pair $R_2$ contains the pattern byte to be processed (from operand 1 of the ED or EDMK) in bits 16:23; the fill byte in bits 8:15; and the next operand 2 byte from the ED or EDMK in bits 56:63 (i.e. bits 24:31 of MGR $R_2$+1). The result byte generated is placed in bits 24:31 of MGR $R_1$ by this instruction. Bits 0:23 of the value placed in MGR $R_1$ are unpredictable.

The EDBYT instruction defined by FIG. 3 both uses and sets the Millicode Flags, reflecting the status of the ED or EDMK state sequence.

FLAG 0 is used as the significance indicator. FLAG 1 indicates which digit (right or left) of the source byte is to be used next. FLAG 2 indicates whether a "mark" point (for EDMK) has been identified (this is set whenever condition code 2 or condition code 3 is indicated by EDMK). FLAG 3 indicates that a non-zero digit has been found in the current field. These flags should all be set to '0'b at the start of the ED or EDMK millicode routine; subsequent updates to the flags are performed by hardware as part of the EDBYT instruction.

Execution of EDBYT, including formation of the result byte and update of the Millicode flags, is done according to FIG. 8-3 in in the definition of the Edit instruction in the ESA/390 Principles of Operation. (SEE FIG. ?? on page 25 WHICH IS A COPY OF THE REFERENCED FIGURE.)

The condition code is set to indicate whether a new operand 2 byte is needed and whether the current operand 1 position must be noted for EDMK to use in updating GPR1, as follows:

| Code | Condition |
| --- | --- |
| 0 | None of the conditions below are met |
| 1 | New operand 2 byte needed |
| 2 | Mark operand 1 position for EDMK |
| 3 | New operand 2 byte needed and mark operand 1 position for EDMK |

Table Summary of Editing Functions

| | Conditions | | | | Results | |
| --- | --- | --- | --- | --- | --- | --- |
| Pattern Byte | Previous State of Significance Indicator | Source Digit | Right Four Source Bits Are Plus Code | Result Byte | | State of Significan Indicator End of Dig Ex- aminatio |
| Digit selector | Off | 0 | * | Fill byte | | Off |
| | | 1–9 | No | Source digit# | | On |
| | | 1–9 | Yes | Source digit# | | Off |
| | On | 0–9 | No | Source digit | | On |
| | | 0–9 | Yes | Source digit | | Off |
| Significance starter | Off | 0 | No | Fill byte | | On |
| | | 0 | Yes | Fill byte | | Off |
| | | 1–9 | No | Source digit# | | On |
| | | 1–9 | Yes | Source digit# | | Off |
| | On | 0–9 | No | Source digit | | On |
| | | 0–9 | Yes | Source digit | | Off |
| Field separator | * | ** | ** | Fill byte | | Off |
| Message byte | Off | ** | ** | Fill byte | | Off |
| | On | ** | ** | Message byte | | On |

Explanation:
*No effect on result byte or on new state of significance indicator.
**Not applicable because source is not examined.
for EDIT AND MARK only, the address of the rightmost such result byte is placed in general register 1.

Specialized Millicode Instruction for Translate and Test

The solution described here is to define a new instruction for use by internal code (millicode) in support of the ESA/390 instruction Translate and Test (TRT). This instruction uses information in general registers, the condition code, and the millicode flags to generate the required values and to update general register 1, general register 2, and the condition code, as required by the ESA/390 architecture.

A formal definition of this instruction follows. In addition, this invention makes use of the results from millicode instruction Translate Fetch, which was implemented in a prior design and as we discussed above "Translate Fetch (TRFET)" was provided specifically for use in execution of the ESA/390 Translate and Translate and Test instructions. For this invention, the Translate Fetch instruction previously introduced was modified to update the millicode flags as well. This invention also makes use of the millicode flags, which have been discussed. The TRT Ending is illustrated by FIG. 4.

The contents of MGR pairs ($R_1,R_1+1$) and ($R_2,R_2+1$), the condition code, and the millicode flags are used to form the result values (program GR1, program GR2, and program condition code) for an ESA/390 Translate and Test (TRT) instruction. In this usage (which is the only usage supported for this instruction), MGR pair ($R_1,R_1+1$) must contain the result of a TRFET instruction in which a non-zero result byte was found (i.e. CC≠0); MGR $R_2$ must contain the current value of program GR2; and MGR $R_2+1$ must contain the address of the byte of operand 1 (from the TRT instruction) which was translated to the left-most byte of MGR $R_1$ by TRFET. The condition code and millicode flags must have been set by the TRFET which loaded MGR pair ($R_1,R_1+1$).

The hardware determines the location of the first non-zero byte in the TRFET result using the condition code and millicode flags. This byte is extracted from MGR $R_1$ or $R_1+1$, inserted into byte of the value in MGR $R_2$, and the result is written to program GR2. The byte index of the selected byte from MGR pair ($R_1,R_1+1$) is added to the value in MGR $R_2+1$ to form the address to be written in GR1 for the ESA/390 TRT instruction. When the program is in 24-bit mode, bits 8:31 of this address are written to bits 8:31 of program GR1, and bits 0:7 of program GR1 are unchanged. When the program is in 31-bit mode, bits 1:31 of this address are written to bits 1:31 of program GR1, and bit 0 of program GR1 is set to zero. The program condition code is set to 1.

No millicode GRs are written by TRTX, and the millicode condition code is not changed.

A hardware interlock prevents the decoding of any ESA/390 (i.e. non-millicode) instructions while a TRTX is waiting to be executed. This insures that the updates to program GRs by TRTX are properly reflected in the execution of subsequent program instructions even when TRTX is followed shortly by MCEND in a millicode routine.

Specialized Millicode Instructions for Packed Decimal Division

The solution described here is to define a set of three new instructions for use by internal code (millicode) in support of the ESA/390 instruction Divide Decimal. These instructions make use of the hardware control and dataflow logic designed to support simpler packed decimal operations (such as Add) to provide operand accss, checking, prepartion, and storing functions, and to generate the quotient digits as needed for the DP instruction. By utilizing existing logic, the unique hardware required for DP support kept to a minimum; by implementing these as internal code instructions, rather implementing the entire DP function in hardware, control is maintained in internal code, allowing simpler handling of unusual and boundary conditions.

The first instruction, Divide Decimal Fetch, fetches the operands from storage, extends them on the left with zero digits as needed, checks the digits and sign for validity, strips off and records the signs, computes the number of significant digits in each operand, and saves its results in general registers and in the condition code. This instruction is used once for each execution of the ESA/390 DP instruction.

The second instruction, Divide Decimal Quotient, computes one digit of the quotient using operands stored in general registers. This is used once for each quotient digit to be generated.

The third instruction, Divide Decimal Store, inserts a sign and then writes a decimal result into storage. This is used twice in the internal code for DP, once each for the quotient and remainder.

Formal definitions of these instructions follow in the drawings in which FIG. 5A represents the Divide Decimal Fetch.

The packed decimal operands for an ESA/390 Divide Decimal (DP) instruction are fetched and analyzed in preparation for execution of the DP operation. The first operand (dividend) is fetched from the storage location specified by $D_1(B_1)$ using MGR1.24:27 as the length field. The second operand (divisor) is fetched from the storage location specified by $D_2(B_2)$ using MGR1.28:31 as the length field. Both operands are checked for valid decimal digits and signs, and a decimal data exception is forced if any invalid digit or sign is found. The dividend is stored in MGRs 2–5, left-aligned such that the most significant non-zero digit is in MGR2.4:7, with zeros in MGR2.0:3 and zeros in all digit positions to the right of the last digit of the dividend, with the sign digit removed. The divisor is stored in MARs 6–7, left-aligned such that the most significant non-zero digit is in MAR6.4:7, with zeros in MAR6.0:3 and zeros in all digit positions to the right of the last digit of the divisor, with the sign digit removed. (Note that the ESA/390 architecture requires that the length of the divisor ($L_2$ of the DP instruction) be no greater than 8 bytes, so that with the sign removed and the alignment defined here, it is guaranteed to fit within MARs 6–7. No check is made by this instruction that the length meets that requirement, since the corresponding check is performed by the hardware when the DP instruction is decoded.)

The numbers of significant digits in each of the decimal operands are computed (Op1SD, Op2SD) by counting decimal digits beginning with the leftmost non-zero digit and ending with the rightmost digit; trailing zeros in a non-zero number are counted as significant, and a value of zero is considered to have zero significant digits. The number of potential quotient digits (QSD) is computed as QSD= Op1SD−Op2SD+1; if Op2SD>Op1SD, QSD=0. Op1SD is written to MAR1.25:29, Op2SD is written to MGR6.25:29, QSD is written to MGR7.27:31; zeros are written to MAR1.0:24, MAR1.30:31, MGR6.0:24, MGR6.30:31, and MGR7.0:26.

Millicode Flag 0 is set to '1'b if the quotient will be negative, and to '0'b if it will be positive. Similarly, millicode Flag 1 is set to the sign of the remainder (which is the same as the sign of operand 1). Millicode Flag 3 is set to '1'b if Op2SD<8, and to '0'b otherwise.

The condition code is set to 3 if the divisor is 0 (Op2SD= 0); otherwise the condition code is set to 2 if Op1SD>15; otherwise the condition code is set to 1 if Op1SD<Op2SD (including the case of Op1SD=0); otherwise the condition code is set to 0.

FIG. 5B illustrates the Divide Decimal Quotient. One digit is computed of the quotient for an ESA/390 Divide Decimal (DP) instruction. $R_1$ specifies an even/odd pair of MGRs containing an unsigned decimal value of up to 16 digits; in the intended usage, this is the working dividend for the DP operation, left-aligned with at most one leading zero digit. $R_2$ specifies an even/odd pair of MARs containing an unsigned decimal value of up to 16 digits; in the intended usage, this is the divisor for the DP operation, left-aligned with exactly one leading zero digit. $R_3$ specifies an even/odd pair of MGRs which will contain the quotient digit computed by this instruction; in the intended usage, this is the partial quotient for the DP operation.

The decimal value in MGR pair $R_1$ is reduced by an integral multiple of the decimal value in MAR pair $R_2$ such that the resulting (reduced) value is less than the decimal value in MAR pair $R_2$. This resulting value is then shifted left 4 bits, inserting zeros in bits 60:63, and then written to MGR pair $R_1$. (Note that in the intended usage, bits 0:3 of the value in MAR pair $R_2$ must be zero, so that bits 0:3 of the reduced value must be zero prior to this shift operation.)

The quotient digit (QX) is computed as the multiple of the value in MAR pair $R_2$ by which the value in MGR pair $R_1$ is reduced. (Note that in the intended usage, this must be an integer in the range 0–9; other usage yields unpredictable results.) The value in MGR pair $R_3$ is shifted left 4 bits, QX is inserted in bits 60:63, and the result is written to MGR pair $R_3$.

This instruction requires a variable number of execution cycles depending on the value of QX.

The condition code is not changed by this instruction.

The Divide Decimal Store is illustrated by FIG. 5C. The decimal result in MGRs 4–7 is stored at the second-operand address. The length of the operand to be stored is specified in MGR1.28:31; bits 24:27 of MGR1 must be zero, and bits 0:23 of MGR1 are ignored. The decimal value to be stored must be right-aligned in MGRs 4–7, with the least significant decimal digit in MGR7.28:31. If millicode Flag 0 is '0'b, the decimal value is stored as a positive number; if Flag 0 is '1'b, the value is stored as a negative number.

The decimal operand is shifted left 4 bits and the preferred sign code for the specified sign is inserted on the right. The rightmost <n> bytes of this signed decimal number are then stored beginning at the storage address specified by $D_2(B_2)$, where <n>=(1+MGR1.28:31). The portion of MGRs 4–7 not required to form an operand of this length is ignored. Storage access exceptions for operand 2 will be taken only for the bytes indicated by the length in MGR1.28:31.

The condition code is not changed by this instruction.

This preferred embodiment provides better performance than one which uses only the general set of internal code instructions. It is substantially simpler and more flexible than would be any completely hard-wired solution we can envision. This embodiment will be used to build an ESA/390 processor which uses millicode or other internal code similar in form or structure to millicode.

While we have described our preferred embodiments of our invention, it will be understood that those skilled in the art, both now and in the future, may make make various improvements and enhancements which fall within the scope of the claims which follow. These claims should be construed to maintain the proper protection for the invention first disclosed.

What is claimed is:

1. A computer system having a pipelined computer processor, which executes a relatively simple instruction set in a hardware controlled execution unit and executes a relatively complex instruction set in a milli-mode architected state with a millicode sequence of simple instructions in said hardware controlled execution unit, a millicode method for setting and testing conditions with specialized update and branch instructions comprising the steps of: storing in an internal code array milli-mode routines as said set of millicode simple instructions, and when milli-mode detection logic coupled to instruction registers of said processor detects that a macro-instruction, which is being decoded, is of a type that is to be interpreted in said milli-mode architected operating state then said milli-mode architected state is enabled with a milli-mode recognition signal and macro-mode decoding by said processor is suspended to cause the system to subsequently use processor milli-registers, whereupon a milli-mode entry point address is generated to address the millicode stored in said internal code array which are fetched from said internal code array and sent to said processor instruction registers whereupon the processor's decoder decodes them and schedules them for execution upon entry into the processor milli-mode, and whereupon on entry to a milli-mode millicode routine one or more specialized millicode instructions for packed decimal division which make use of the hardware control and dataflow logic designed to support simpler packed decimal operations including Add to provide operand access, checking, preparation, and storing functions, and to generate the quotient digits as needed for the DP instruction are implemented as internal code instructions, rather than implementing the entire DP function in hardware, and control is maintained in internal code allowing simpler handling of unusual and boundary conditions; and wherein one of said specialized millicode instructions for packed decimal division, a Divide Decimal Fetch, fetches the operands from storage, extends them on the left with zero digits as needed, checks the digits and sign for validity, strips off and records the signs, computes the number of significant digits in each operand, and saves its results in general registers and in the condition code.

2. A method according to claim 1 wherein said Divide Decimal Fetch instruction is used once for each execution of an ESA/390 Divide Decimal (DP) instruction.

3. A method according to claim 1 wherein one of said specialized millicode instructions for packed decimal division, a Divide Decimal Quotient, computes one digit of the quotient using operands stored in general registers, and wherein said Divide Decimal Quotient instruction is used once for each quotient digit to be generated.

4. A method according to claim 1 wherein one of said specialized millicode instructions for packed decimal division, a Divide Decimal Store, inserts a sign and then writes a decimal result into storage, and wherein the Divide Decimal Store instruction is used twice in the internal code for DP, once each for the quotient and remainder.

* * * * *